UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

MANUFACTURE AND PRODUCTION OF ISOPRENE.

1,056,817.     Specification of Letters Patent.     Patented Mar. 25, 1913.

No Drawing. Original application filed December 6, 1911, Serial No. 664,137. Divided and this application filed March 2, 1912. Serial No. 681,284.

*To all whom it may concern:*

Be it known that we, GEORG MERLING and HUGO KÖHLER, doctors of philosophy, chemists, citizens of the German Empire, residing at Elberfeld, Germany, have invented new and useful Improvements in the Manufacture and Production of Isoprene, of which the following is a specification.

The present application is a divisional application of our application Serial No. 664,137, filed December 6, 1911 and concerns the manufacture and production of isoprene by distilling with a caustic alkali or an earth alkali, the halogen ammonium halogenid of the formula:

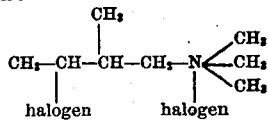

In order to illustrate the new process more fully the following example is given, the parts being by weight:—

*Manufacture and production of isoprene from the tetraammonium chlorid:*

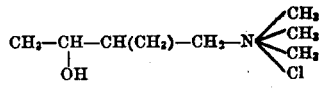

The ammonium chlorid which can be obtained by directly combining the oxy base:

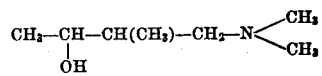

with methyl chlorid or by converting the ammonium iodid thereof (melting point 145–146° C.) with silver chlorid is a colorless, deliquescent crystal mass. It is dissolved in about 5 parts of water and the well cooled solution is saturated with hydrobromic acid or hydrochloric acid, and heated in an autoclave on the boiling water bath for about 24 hours. When the clear solution is evaporated on the water bath or the water and the superfluous hydrogen-halid is separated in another suitable manner, the bromo- or chloro-ammonium chlorid:

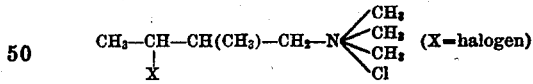

remains as a thick brown syrup, which is distilled with about three times its quantity of pulverized caustic potash or soda or also with calcium or barium hydroxid with or without the addition of alcohol or water. The isoprene distils over, it is collected in a tube, cooled with ice, separated from trimethylamin by washing it with diluted sulfuric acid, dried and distilled. It boils constantly at 34° C. The yield is nearly theoretical.

We claim:—

1. The process for producing isoprene, which process consists in first heating with an alkali a halogen-ammonium-halogenid of the formula:

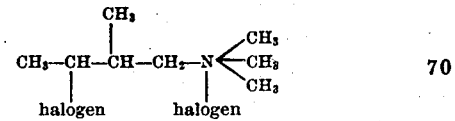

and secondly isolating the isoprene from the resulting mixture, substantially as described.

2. The process of producing isoprene from the halogen ammonium halogenid of the following graphically represented formula:

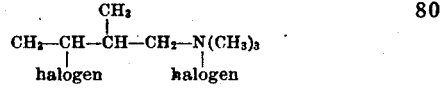

which comprises heating such halogenid with an alkali.

3. The process of producing an erythrene hydrocarbon which comprises heating a halogen ammonium halogenid containing the following graphically represented nucleus:

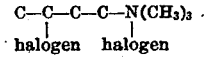

with an alkali.

In testimony whereof we have hereunto set our hands in the presence of two subscribing witnesses.

GEORG MERLING. [L. S.]
         HUGO KÖHLER. [L. S.]

Witnesses:
    HELEN NUFER,
    A. NUFER.